US009259807B2

(12) United States Patent
Means et al.

(10) Patent No.: US 9,259,807 B2
(45) Date of Patent: Feb. 16, 2016

(54) METHOD FOR REPAIRING A BUNDLED TUBE FUEL INJECTOR

(71) Applicant: General Electric Company, Schenectady, NY (US)

(72) Inventors: Gregory Scott Means, Simpsonville, SC (US); Steven Charles Woods, Easley, SC (US); Mark Carmine Bellino, Greenville, SC (US); James Christopher Monaghan, Moore, SC (US); Jonathan Dwight Berry, Simpsonville, SC (US); Patrick S. Riley, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 242 days.

(21) Appl. No.: 14/105,353

(22) Filed: Dec. 13, 2013

(65) Prior Publication Data
US 2015/0165568 A1    Jun. 18, 2015

(51) Int. Cl.
*B23P 6/00* (2006.01)
*F23R 3/28* (2006.01)

(52) U.S. Cl.
CPC .............. *B23P 6/002* (2013.01); *B23P 6/005* (2013.01); *F23R 3/286* (2013.01); *B23P 2700/13* (2013.01); *F02M 2200/8061* (2013.01); *F02M 2200/8069* (2013.01); *F05D 2230/80* (2013.01); *F23R 2900/00016* (2013.01); *F23R 2900/00019* (2013.01); *Y10T 29/49726* (2015.01); *Y10T 29/49728* (2015.01)

(58) Field of Classification Search
CPC ............ B23P 6/00; B23P 6/002; B23P 6/005; B23P 2700/13; F05D 2230/72; F05D 2230/80; F02M 2200/80; F02M 2200/8061; F02M 2200/8069; F02M 2200/8076; F02M 2200/8084; F23R 2900/00016; Y10T 29/49726; Y10T 29/49728; Y10T 29/49732; Y10T 29/49734
See application file for complete search history.

(56) References Cited

U.S. PATENT DOCUMENTS

| | | | |
|---|---|---|---|
| 4,440,339 A | 4/1984 | Tamai et al. | |
| 4,615,477 A * | 10/1986 | Spada | F16L 41/084 228/119 |
| 4,694,549 A * | 9/1987 | Rabe | B23P 6/00 138/97 |
| 5,061,433 A | 10/1991 | Gente et al. | |
| 5,091,140 A | 2/1992 | Dixon et al. | |
| 5,202,082 A | 4/1993 | Brown et al. | |
| 5,404,382 A * | 4/1995 | Russ | G21C 13/036 29/402.08 |
| 5,542,177 A | 8/1996 | Hillestad | |
| 5,623,763 A | 4/1997 | McClellan et al. | |
| 5,992,019 A | 11/1999 | May et al. | |
| 7,252,138 B2 | 8/2007 | Burkhalter et al. | |

(Continued)

FOREIGN PATENT DOCUMENTS

DE    3942271 A1    7/1991

OTHER PUBLICATIONS

A European Search Report and Opinion issued in connection with corresponding EP Application No. 14197564 on Jun. 30, 2015.

*Primary Examiner* — Christopher Besler
(74) *Attorney, Agent, or Firm* — Dority & Manning, PA (57) ABSTRACT

A method for repairing a bundled tube fuel injector includes removing a portion of a pre-mix tube, aligning a tube tip with the remaining portion pre-mix tube and fixedly connecting the tube tip to the pre-mix tube. The method may further include removing an aft plate and an outer shroud from the bundled tube fuel injector so as to expose the pre-mix tube.

14 Claims, 9 Drawing Sheets

(56) References Cited

U.S. PATENT DOCUMENTS

| | | |
|---|---|---|
| 7,551,705 B2 | 6/2009 | Pabis et al. |
| 8,276,836 B2 | 10/2012 | MacMillan et al. |
| 8,375,548 B2 | 2/2013 | Stastny et al. |
| 2012/0192568 A1* | 8/2012 | Miura .................... F23R 3/286 60/776 |
| 2013/0298368 A1 | 11/2013 | Arellano |

* cited by examiner

METHOD FOR REPAIRING A BUNDLED TUBE FUEL INJECTOR

FIELD OF THE INVENTION

The present invention generally involves a bundled tube fuel injector such as may be incorporated into a combustor of a gas turbine or other turbomachine. Specifically, the invention relates to a method for repairing a pre-mix tube of the bundled tube fuel injector.

BACKGROUND OF THE INVENTION

Gas turbines are widely used in industrial and power generation operations. A typical gas turbine may include a compressor section, a combustion section disposed downstream from the compressor section, and a turbine section disposed downstream from the combustion section. A working fluid such as ambient air flows into the compressor section where it is progressively compressed before flowing into the combustion section. The compressed working fluid is mixed with a fuel and burned within one or more combustors of the combustion section to generate combustion gases having a high temperature, pressure and velocity. The combustion gases flow from the combustors and expand through the turbine section to produce thrust and/or to rotate a shaft, thus producing work.

The combustors may be annularly arranged between the compressor section and the turbine section. In a particular combustor design, the combustors include one or more axially extending bundled tube fuel injectors that extend downstream from an end cover.

The bundled tube fuel injector generally includes a plurality of pre-mix tubes arranged radially and circumferentially across the bundled tube fuel injector. The pre-mix tubes extend generally parallel to one another. An outer shroud extends circumferentially around the pre-mix tubes downstream from a fuel distribution module of the bundled tube fuel injector. An aft plate extends radially and circumferentially across a downstream end of the outer shroud adjacent to a combustion chamber or zone defined within the combustor. A cooling air or purge air plenum is at least partially defined within the outer shroud between the fuel distribution manifold and the aft plate. In a conventional bundled tube fuel injector, a downstream or end portion of each pre-mix tube extends through the aft plate such that an outlet of each tube is downstream from a hot side surface of the aft plate, thus providing for fluid communication into the combustion chamber or zone.

Each of the pre-mix tubes extends generally axially through the fuel distribution module and the cooling air plenum. The compressed working fluid is routed through inlets of each of the parallel pre-mix tubes upstream from the fuel distribution module. Fuel is supplied to the fuel plenum through the fluid conduit and the fuel is injected into the pre-mix tubes through one or more fuel ports defined within each of the pre-mix tubes. The fuel and compressed working fluid mix inside the pre-mix tubes before flowing out of the outlet which is defined at the downstream or end portion of each of the pre-mix tubes and into the combustion chamber or zone for combustion.

During operation of the combustor, the downstream or end portion of the pre-mix tubes is exposed to extreme temperatures due their proximity to the combustion chamber and/or the combustion flame. Over time, the downstream or end portion of the pre-mix tubes degrades due to the thermal stresses, thus requiring scheduled inspection and in some cases repair or refurbishment of the bundled tube fuel injectors. Therefore, a method for repairing the bundled tube fuel injector, particularly the pre-mix tubes, would be useful.

BRIEF DESCRIPTION OF THE INVENTION

Aspects and advantages of the invention are set forth below in the following description, or may be obvious from the description, or may be learned through practice of the invention.

One embodiment of the present invention is a method for repairing a bundled tube fuel injector. The method includes removing a portion of a pre-mix tube, aligning a tube tip with the remaining portion pre-mix tube and fixedly connecting the tube tip to the pre-mix tube.

Another embodiment of the present disclosure is a method for repairing a bundled tube fuel injector. The method includes removing an aft plate from the bundled tube fuel injector. A tube tip is then seated circumferentially around an end portion of the pre-mix tube such that the tube tip defines a heat shield that extends radially inwardly across a radially extending surface of the pre-mix tube. The method further includes fixedly connecting the tube tip to the end portion of the pre-mix tube.

Another embodiment of the present invention includes a method for repairing a bundled tube fuel injector having a plurality of parallel pre-mix tubes arranged annularly about an axial centerline of the bundled tube fuel injector and segmented into radially separated rows. The method includes removing an outer shroud and aft plate from the bundled tube fuel injector to expose a portion of the pre-mix tubes. The method further includes removing a damaged portion of the pre-mix tubes where the pre-mix tubes of an outer radial row are cut to a shorter axial length than an adjacent inner radial row. The method also includes aligning a tube tip with a corresponding pre-mix tube and fixedly connecting the tube tip to the pre-mix tube.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although exemplary embodiments of the present invention will be described generally in the context of a bundled tube fuel injector incorporated into a combustor of a gas turbine for purposes of illustration, one of ordinary skill in the art will readily appreciate that embodiments of the present invention may be applied to any combustor incorporated into any turbomachine and are not limited to a gas turbine combustor unless specifically recited in the claims.

Figure 1:
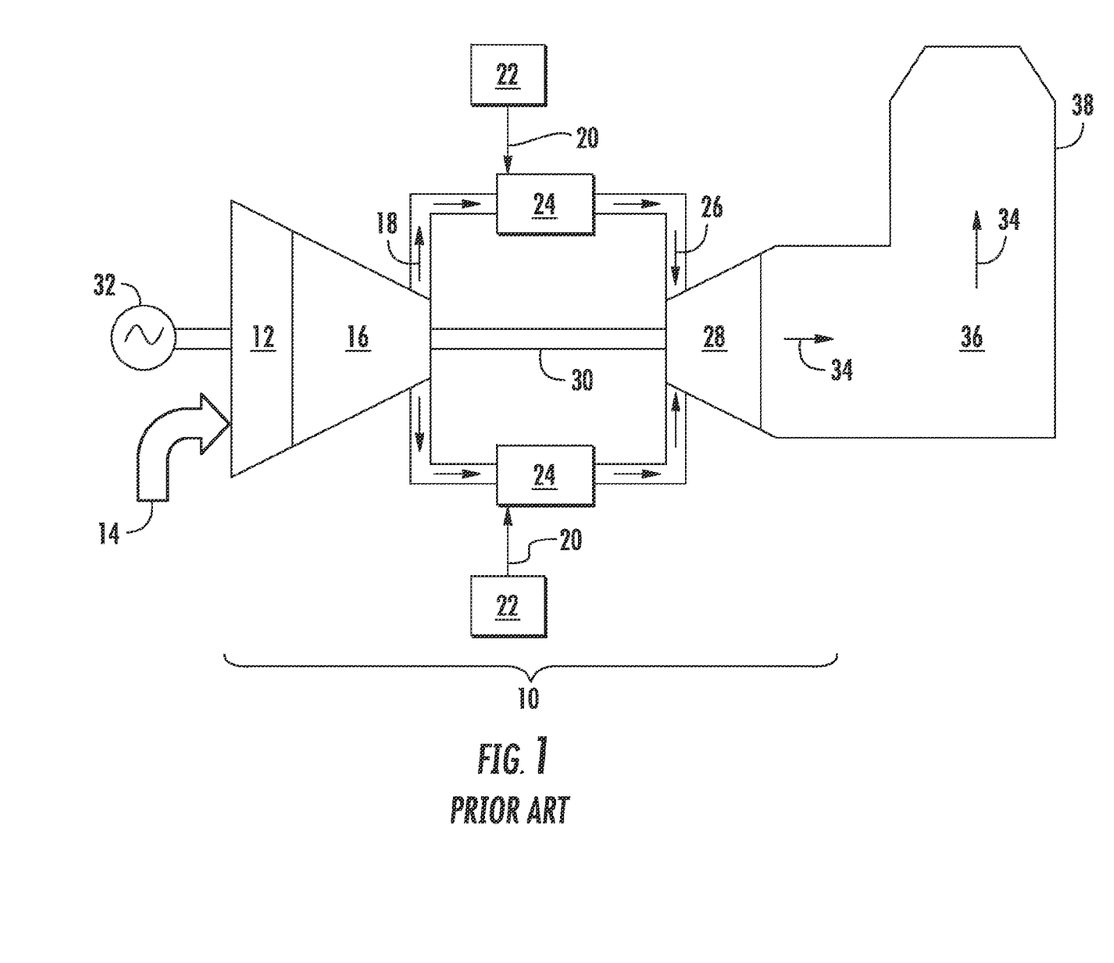
FIG. 1 provides a functional block diagram of an exemplary gas turbine that may incorporate various embodiments of the present invention.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22 such as a fuel skid to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
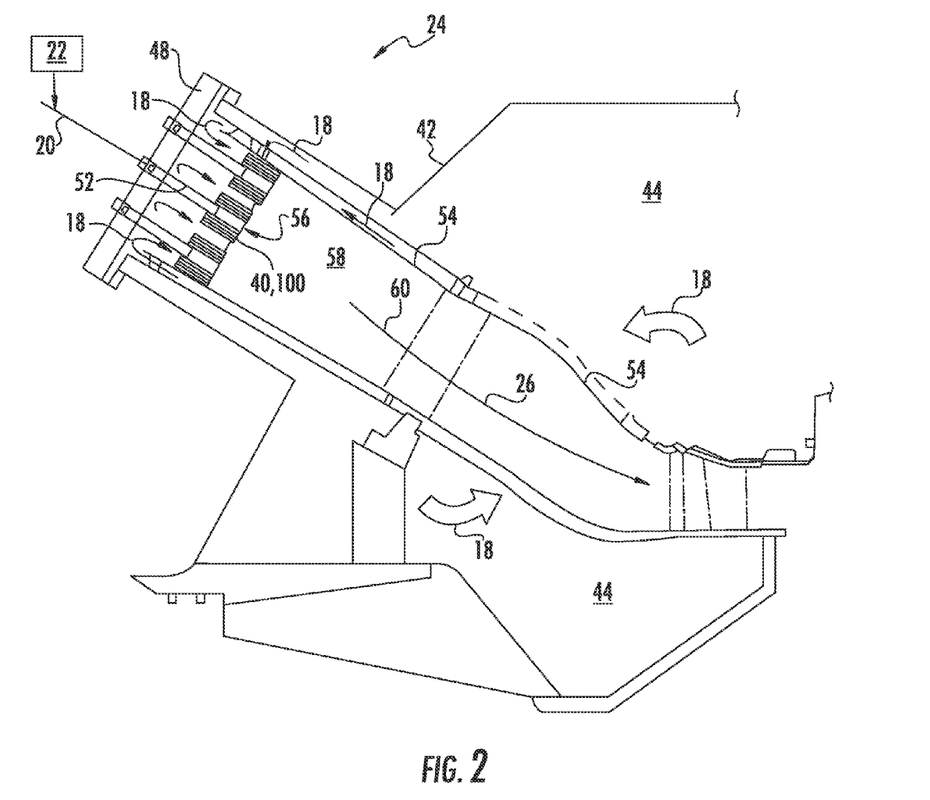
FIG. 2 is a simplified cross-section side view of an exemplary combustor as may incorporate various embodiments of the present invention.

FIG. 2 provides a simplified cross section of an exemplary combustor 24 as may incorporate a bundled tube fuel injector 40 configured according to at least one embodiment of the present disclosure. As shown, the combustor 24 is at least partially surrounded by an outer casing 42. The outer casing 42 at least partially forms a high pressure plenum 44 around the combustor 24. The high pressure plenum 44 may be in fluid communication with the compressor 16 or other source for supplying the compressed working fluid 18 to the combustor 24. In one configuration, an end cover 48 is coupled to the outer casing 42. The end cover 48 may be in fluid communication with the fuel supply 22.

The bundled tube fuel injector 40 extends downstream from the end cover 48. The bundled tube fuel injector 40 may be fluidly connected to the end cover 48 so as to receive fuel from the fuel supply 22. For example, a fluid conduit 52 may provide for fluid communication between the end cover 48 and/or the fuel supply 22 and the bundled tube fuel injector 40. One end of an annular liner 54 such as a combustion liner and/or a transition duct surrounds a downstream end 56 of the bundled tube fuel injector 40 so as to at least partially define a combustion chamber 58 within the combustor 24. The liner 54 at least partially defines a hot gas path 60 for directing the combustion gases 26 from the combustion chamber 58 through the combustor 24. For example, the hot gas path 60 may be configured to route the combustion gases 26 towards the turbine 28 and/or the exhaust section.

In operation, the compressed working fluid 18 is routed towards the end cover 48 where it reverses direction and flows through one or more of the bundled tube fuel injectors 40. The fuel 20 is provided to the bundled tube fuel injector 40 and the fuel 20 and the compressed working fluid 18 are premixed or combined within the bundled tube fuel injector 40 before being injected into a combustion chamber 58 for combustion.

Figure 3:
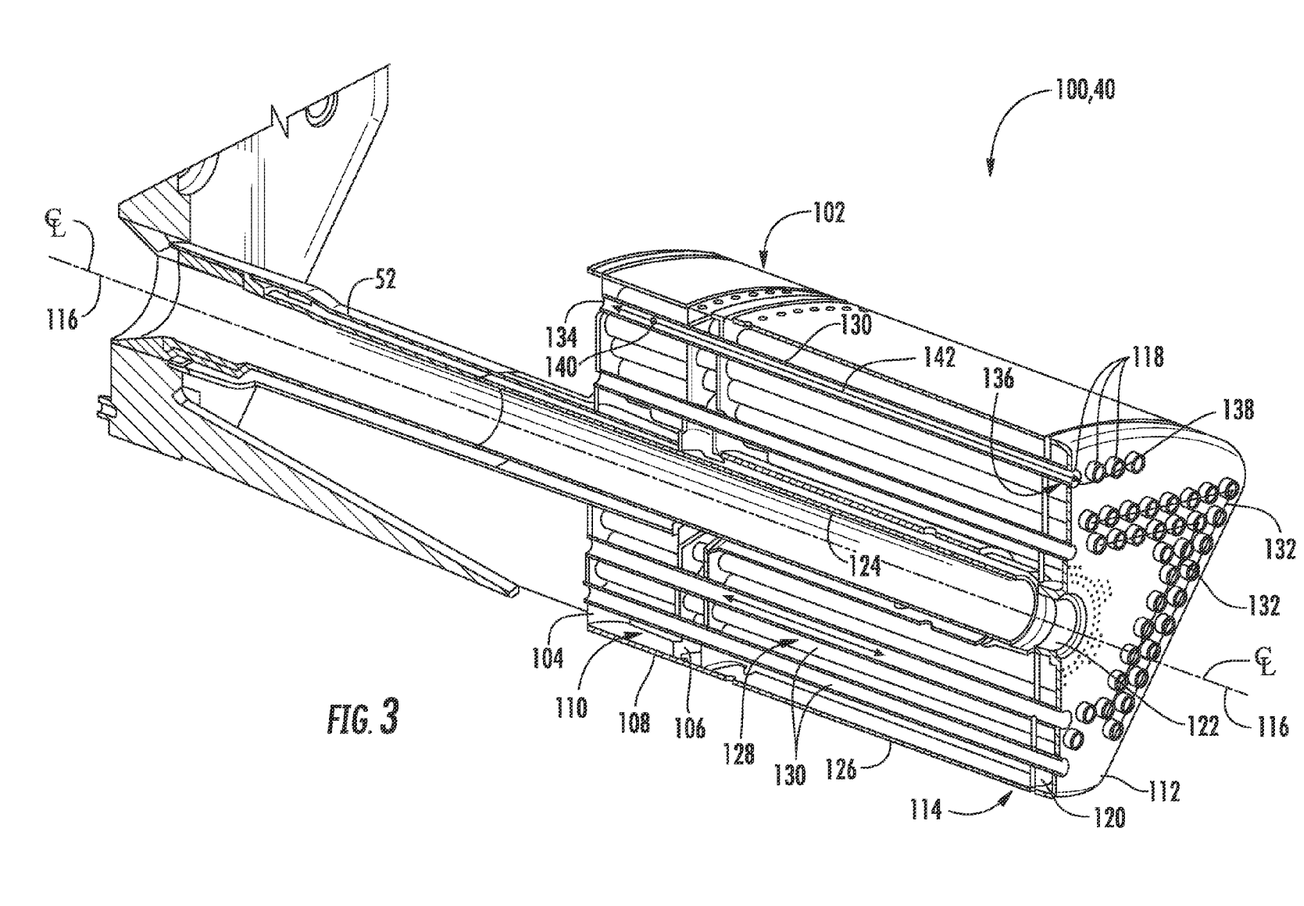
FIG. 3, is a cross section perspective view of an exemplary bundled tube fuel injector according to one embodiment of the present invention.

FIG. 3 is a cross section perspective view of an exemplary bundled tube fuel injector 100 herein referred to as "fuel injector" as may be incorporated into the combustor 24 as described in FIG. 2, according to various embodiments of the present disclosure. As shown, the fuel injector 100 generally includes a fuel distribution module 102 that is in fluid communication with the fluid conduit 52. In particular embodiments, the fuel distribution module 102 includes an upstream plate 104 that is axially separated from a downstream plate 106. The upstream and downstream plates 104, 106 extend generally radially and circumferentially within the fuel injector 100. An outer band 108 circumferentially surrounds and extends axially between the upstream and downstream plates 104, 106. The outer band 108 may extend axially beyond either one or both of the upstream and downstream plates 104, 106. A fuel plenum 110 may be at least partially defined between the upstream and downstream plates 104, 106 and the outer band 108. The fluid conduit 52 provides for fluid communication between the fuel supply 22 (FIG. 2) and the fuel plenum 110.

In particular configurations, an aft plate 112 is disposed at a downstream or aft end 114 of the fuel injector 100. The aft plate 112 extends radially outwardly and circumferentially across the aft end 114 with respect an axial centerline 116 of the fuel injector 100. The aft plate 112 at least partially defines a plurality of tube tip passages 118 that extend generally axially through the aft plate 112.

In particular embodiments, an impingement plate 120 is disposed upstream from the aft plate 112. The impingement plate 120 may be welded, brazed or otherwise coupled to the aft plate 112. The aft plate 112 and/or the impingement plate 120 may at least partially define a cartridge passage 122 that extends generally axially therethrough. A fluid cartridge or fuel nozzle 124 may be coupled to the aft plate 112 at the center nozzle passage 122. An outer shroud 126 may extend generally axially between the fuel distribution module 102 and the aft plate 112. The outer shroud 126 may be coupled to the aft plate 112 and/or the fuel distribution module 102 via welding, brazing, mechanical fasteners or by any suitable means for the operating environment of the fuel injector 100.

As shown in FIG. 3, the fuel injector 100 includes a pre-mix tube bundle 128. The pre-mix tube bundle 128 comprises a plurality of pre-mix tubes 130 that extend generally parallel to one another along or parallel to the axial centerline 116 of the fuel injector 100. The pre-mix tubes 130 extend downstream from the fuel plenum 110 towards the aft plate 112 and/or the combustion chamber 58 (FIG. 2). A portion of the pre-mix tubes 130 extends through the fuel plenum 110.

The pre-mix tubes 130 may be formed from a single continuous tube or may be formed from two or more coaxially aligned tubes fixedly joined together. Although generally illustrated as cylindrical, the pre-mix tubes 130 may be any geometric shape, and the present invention is not limited to any particular cross-section unless specifically recited in the claims. In addition, the pre-mix tubes 130 may be grouped or arranged in circular, triangular, square, or other geometric shapes, and may be arranged in various numbers and geometries.

In one embodiment, each pre-mix tube 130 is generally aligned with a corresponding tube tip passage 118. In one embodiment, the pre-mix tubes 130 are arranged in multiple rows 132. Each row 132 may include one or more of the pre-mix tubes 130. In one embodiment, each row 132 is radially spaced with respect to the axial centerline 116 from an adjacent row 132. The pre-mix tubes 130 of at least some of the rows 132 may be arranged annularly around the axial centerline 116. The pre-mix tubes 130 of each row 132 may be arranged generally circumferentially and radially across the fuel injector 100 with respect to an axial centerline of the combustor 24 and/or the axial centerline 116 of the fuel injector 100.

An exemplary pre-mix tube 130, as shown in FIG. 3, generally includes an inlet 134 defined upstream from the fuel plenum 110 and/or the upstream plate 104. The inlet 134 may be in fluid communication with the high pressure plenum 44 and/or the compressor 16. A downstream or end portion 136 is defined downstream from the fuel plenum 110. A radially extending surface 138 is defined between an inner and outer diameter of the pre-mix tube 130 at a distal end of the end portion 136. One or more fuel ports 140 may provide for fluid communication between the fuel plenum 110 and a corresponding pre-mix passage 142 within the pre-mix tubes 130.

Figure 4:
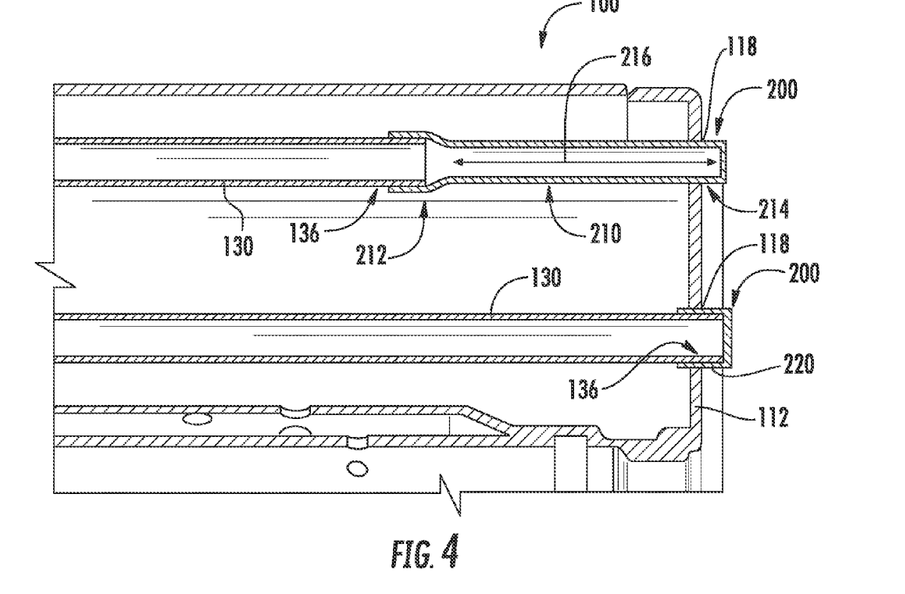
FIG. 4, is an enlarged cross sectional side view of a portion of the bundled tube fuel injector as shown in FIG. 3 including a tube tip, according to various embodiments of the present invention.

FIG. 4 is an enlarged cross sectional side view of a portion of the fuel injector 100 as shown in FIG. 3, according to various embodiments of the present disclosure. In various embodiments, as shown in FIG. 4, a tube tip 200 is fixedly connected to the end portion 136 of a corresponding pre-mix tube 130. In particular embodiments, the tube tip 200 may comprise high temperature alloys that are dissimilar to a material that forms the corresponding pre-mix tube. For example, the tube tip 200 may comprise of at least one of nickel, cobalt, chromium, molybdenum or stainless steel based alloys. In particular embodiments, the fuel injector 100 may include a plurality of tube tips 200 in one or more configurations, as described below, each coupled to a corresponding end portion 136 of a corresponding pre-mix tube 130.

Figure 5:
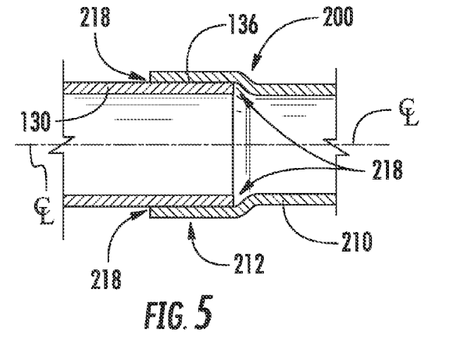
FIG. 5 is an enlarged cross sectional view of an exemplary tube tip and a corresponding pre-mix tube as shown in FIG. 4, according to one embodiment of the present invention.
Figure 6:
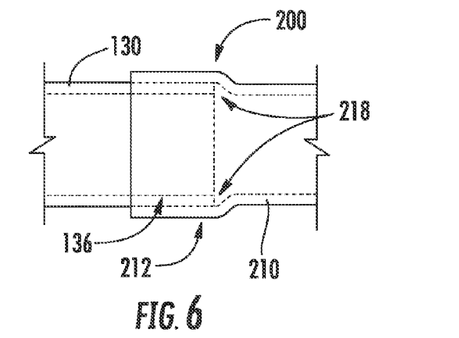
FIG. 6 is an enlarged side view of the exemplary tube tip shown in FIG. 5, fixedly connected to the pre-mix tube.

In one embodiment, as shown in FIG. 4, an exemplary tube tip 210 comprises a mating end 212, an opposing outlet end 214 and a pre-mix portion 216 that extends therebetween. In one embodiment, the outlet end 214 extends axially through a corresponding tube tip passage 118 of the aft plate 112. As detailed in FIGS. 5 and 6, the mating end 212 of the tube tip 210 defines a socket 218. The socket 218 is configured to receive a portion of the end portion 136 of the corresponding pre-mix tube 130. For example, the socket 218 generally has an inner diameter that is greater than an outer diameter of the end portion 136 of the pre-mix tube 130. The socket 218 also extends axially across the end portion 136 with respect to an axial centerline of the pre-mix tube 130 and/or the tube tip 210. The tube tip 210 may be fixedly connected to the pre-mix tube 130 via brazing, welding, adhesive cladding or by any means and/or process suitable for joining the two components.

Figure 7:
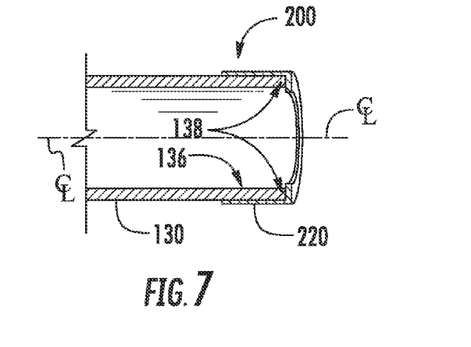
FIG. 7 is an enlarged cross sectional view of an exemplary tube tip and a corresponding pre-mix tube as shown in FIG. 4, according to one embodiment of the present invention.
Figure 8:
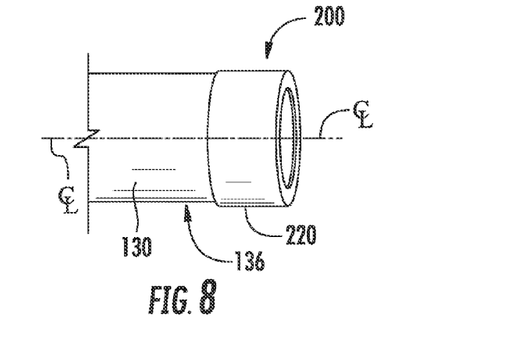
FIG. 8 is an enlarged side view of the exemplary tube tip shown in FIG. 7, fixedly connected to the pre-mix tube.

In one embodiment, as shown in FIG. 4, the end portion 136 of a corresponding pre-mix tube 130 extends through a corresponding tube tip passage 118. In this embodiment, as shown in FIGS. 4, 7 and 8, an exemplary tube tip 220 extends circumferentially around and axially along the end portion 136 of the pre-mix tube 130, thereby forming a collar or sleeve around the end portion 136. The tube tip 220 may be fixedly connected to the pre-mix tube 130 via brazing, welding, adhesive cladding or by any means or process suitable for joining the two components. The tube tip 220 may extend through the aft plate 112 and/or the impingement plate 120.

In one embodiment, as illustrated in FIGS. 7 and 8, the tube tip 220 extends radially inwardly with respect to an axial centerline of the pre-mix tube 130 across the radially extending surface 138 of the pre-mix tube 130, thereby thermally shielding the radially extending surface 138 of the pre-mix tube 130 from the combustion flame and/or the combustion gases 26, thus enhancing thermal and/or mechanical performance of the pre-mix tube 130.

Figure 9:
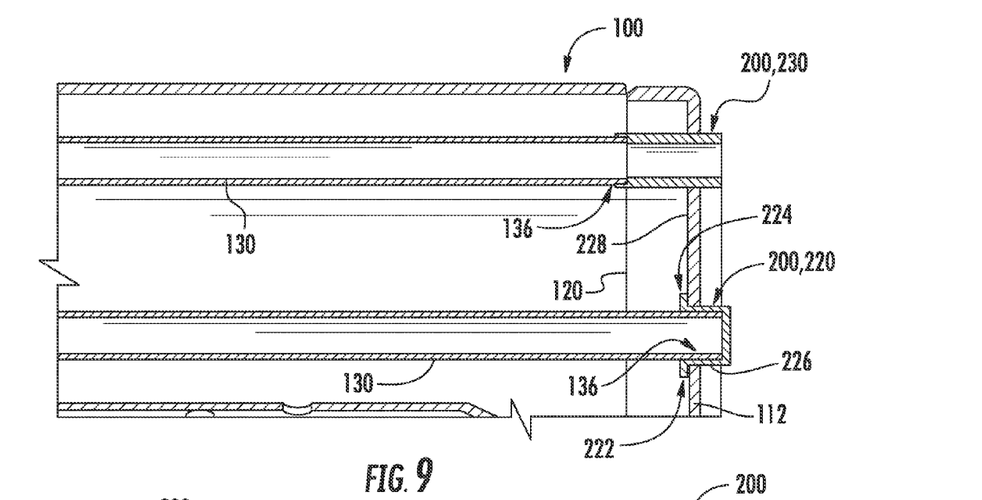
FIG. 9, is an enlarged cross sectional side view of a portion of the bundled tube fuel injector as shown in FIG. 3 including a tube tip, according to various embodiments of the present invention.
Figure 10:
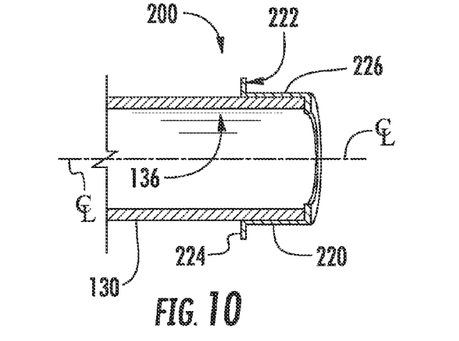
FIG. 10 is an enlarged cross sectional view of an exemplary tube tip and a corresponding pre-mix tube as shown in FIG. 9, according to one embodiment of the present invention.
Figure 11:
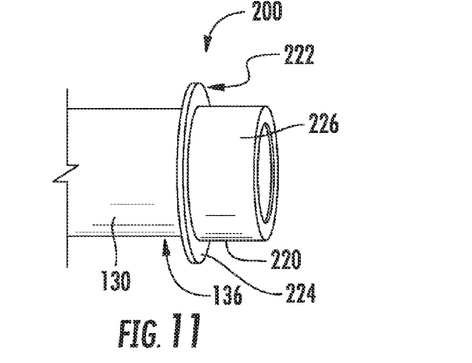
FIG. 11 is an enlarged side view of the exemplary tube tip shown in FIG. 10, fixedly connected to the pre-mix tube.

In one embodiment, as shown in FIGS. 9, 10 and 11, the tube tip 220 includes a retention feature 222. The retention feature 222 may comprise a collar 224 that extends radially outwardly from a main body 226 of the tube tip 220. As shown in FIG. 9, the retention feature 222 may be disposed upstream from the aft plate 112. For example, the retention feature 222 may be disposed adjacent to a cool or upstream side 228 of the aft plate 112. In the alternative, the retention feature 222 may be disposed adjacent to an upstream side of the impingement plate 120. The retention feature may prevent the tube tip 220 from flowing downstream in case the tube tip 220 prematurely liberates from the pre-mix tube 130 during operation of the combustor 24, thereby potentially preventing damage to downstream components such as the liner 54 and/or the turbine 28.

Figure 12:
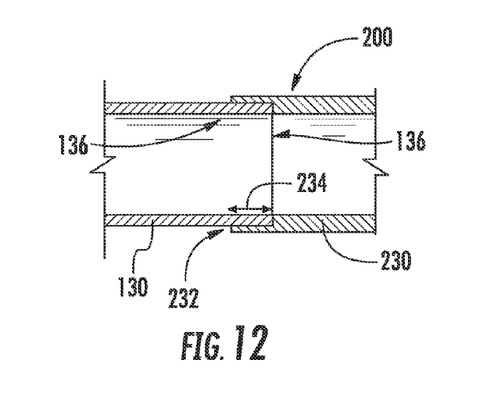
FIG. 12 is an enlarged cross sectional view of an exemplary tube tip and a corresponding pre-mix tube as shown in FIG. 9, according to one embodiment of the present invention.
Figure 13:
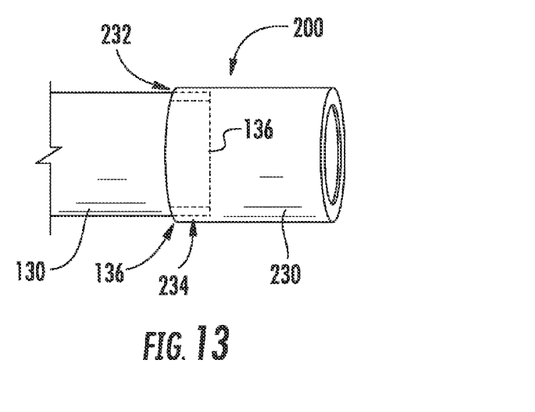
FIG. 13 is an enlarged side view of the exemplary tube tip shown in FIG. 12, fixedly connected to the pre-mix tube.

In one embodiment, as shown in FIG. 9 and as detailed in FIGS. 12 and 13, an exemplary tube tip 230 comprises a radially extending mating surface 232 and a step 234 defined along the radially extending mating surface, wherein the downstream end 136 of the pre-mix tube 130 is seated adjacent to the step 234. The tube tip 230 may be fixedly connected to the pre-mix tube 130 via brazing, welding, adhesive cladding or by any means and/or process suitable for joining the two components. The tube tip 230 may extend through the aft plate 112 and/or the impingement plate 120.

Figure 14:
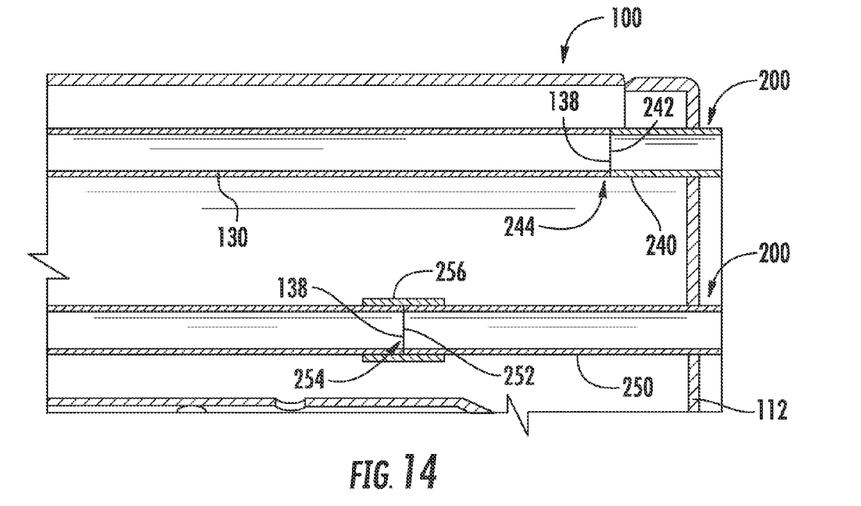
FIG. 14, is an enlarged cross sectional side view of a portion of the bundled tube fuel injector as shown in FIG. 3 including a tube tip, according to various embodiments of the present invention.
Figure 15:
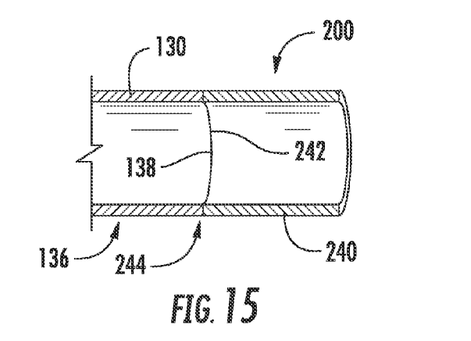
FIG. 15 is an enlarged cross sectional view of an exemplary tube tip and a corresponding pre-mix tube as shown in FIG. 14, according to one embodiment of the present invention.
Figure 16:
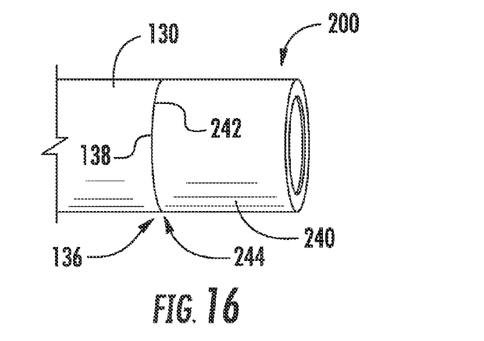
FIG. 16 is an enlarged side view of the exemplary tube tip shown in FIG. 15, fixedly connected to the pre-mix tube.

In one embodiment, as shown in FIGS. 14, 15 and 16, an exemplary tube tip 240 comprises a radially extending mating surface 242 that forms a butt joint 244 with the radially extending end surface 138 of the pre-mix tube. The tube tip 240 comprises a radially extending mating surface 242 that forms a butt joint 244 with the radially extending end surface of the pre-mix tube. The tube tip 240 may be fixedly connected to the pre-mix tube 130 via brazing, welding, adhesive cladding or by any means and/or process suitable for joining the two components. The tube tip may extend through the aft plate 112 and/or the impingement plate 120.

Figure 17:
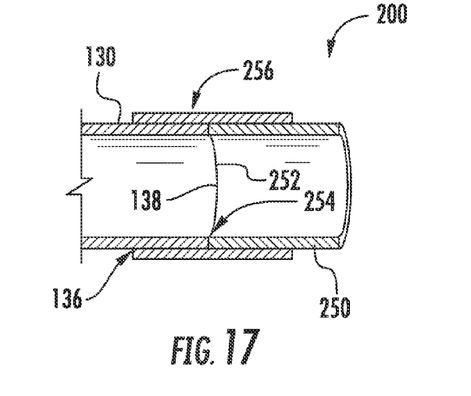
FIG. 17 is an enlarged cross sectional view of an exemplary tube tip and a corresponding pre-mix tube as shown in FIG. 14, according to one embodiment of the present invention.
Figure 18:
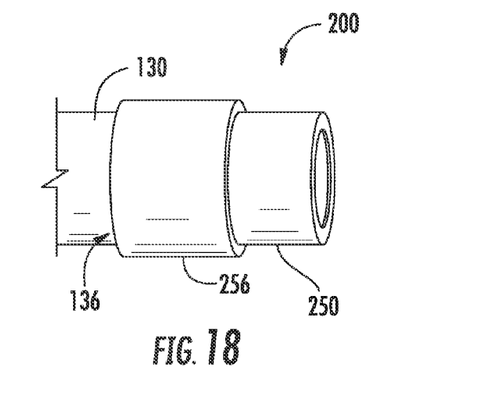
FIG. 18 is an enlarged side view of the exemplary tube tip shown in FIG. 17, fixedly connected to the pre-mix tube.

In one embodiment, as shown in FIGS. 14, 17 and 18, an exemplary tube tip 250 comprises a radially extending mating surface 252 that forms a joint 254 with the radially extending end surface 138 of the pre-mix tube 130. A coupling sleeve 256 circumferentially surrounds the joint 254. The coupling sleeve 256 may be fixedly connected to the pre-mix tube 130 via brazing, welding, adhesive cladding or by any means and/or process suitable for joining the two components. The tube tip 250 may extend through the aft plate 112 and/or the impingement plate 120. The coupling sleeve 256 provides structural support the connection between the pre-mix tube 130 and the tube tip 250.

It should be understood that tube tip 200 includes each of the exemplary embodiments illustrated and described herein as tube tip 210, 220, 230, 240 and 250. In addition, it intended that tube tip 200 include various other tube tip shapes or configurations, and that tube tip 200 should not be limited to the exemplary embodiments provided unless otherwise recited in the claims.

Figure 19:
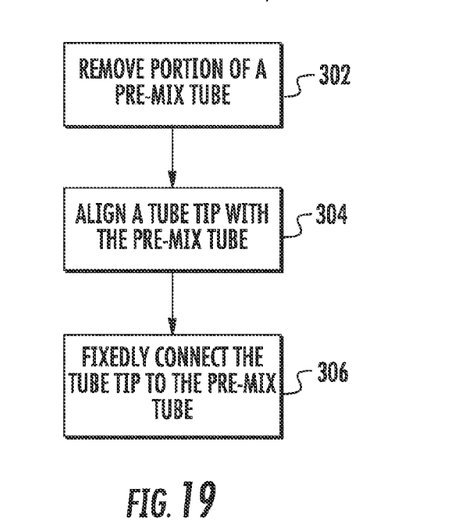
FIG. 19 is a block diagram of an exemplary method for repairing the pre-mix tubes of the bundled tube fuel injector, according to one embodiment of the present disclosure.
Figure 20:
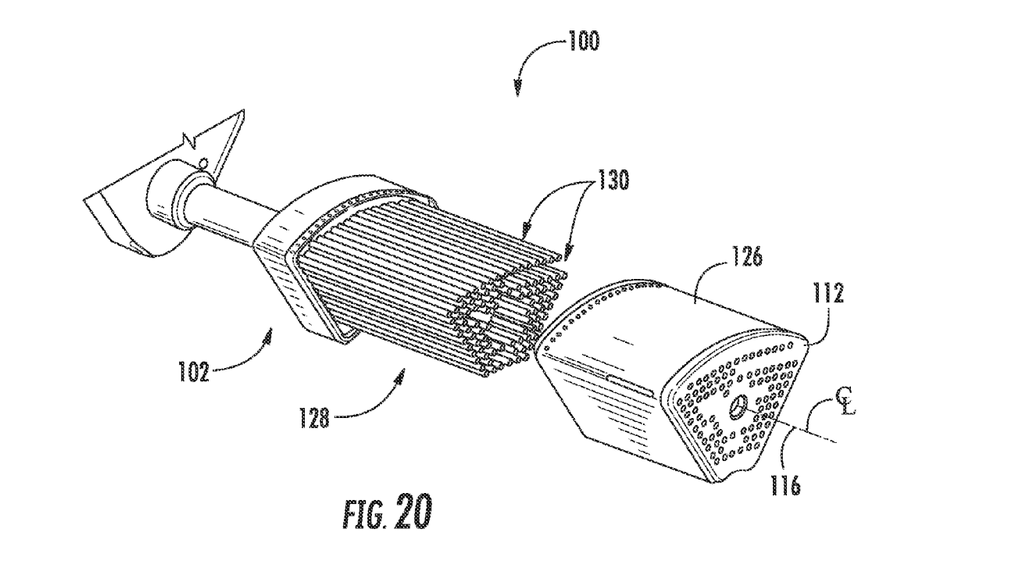
FIG. 20 is a partially exploded perspective view of the bundled tube fuel injector as shown in FIG. 3, according to one embodiment of the present invention.

The various embodiments provided herein and illustrated in FIGS. 3 through 18, provide a method for repairing the pre-mix tubes 130 of the bundled tube fuel injector 100. FIG. 19 provides a block diagram of an exemplary method 300 for repairing the pre-mix tubes 130 of the bundled tube fuel injector 100, according to one embodiment of the present disclosure. At step 302, the method 300 includes removing a portion of the pre-mix tube 130. The portion of the pre-mix tube 130 removed may be defined by a damaged or otherwise compromised portion of the pre-mix tube 130. In one embodiment, the portion of the pre-mix tube 130 may be removed by cutting away at least a portion of the aft plate 112 that surrounds the pre-mix tube 130. In one embodiment, as illustrated in FIG. 20, step 302 may include removing the aft plate 112 and/or the outer shroud 126 so as to expose the pre-mix tubes 130 of the pre-mix tube bundle 128. For example, the outer shroud 126 and/or the aft plate 112 may be cut away or otherwise decoupled from the fuel distribution module 102.

Figure 21:
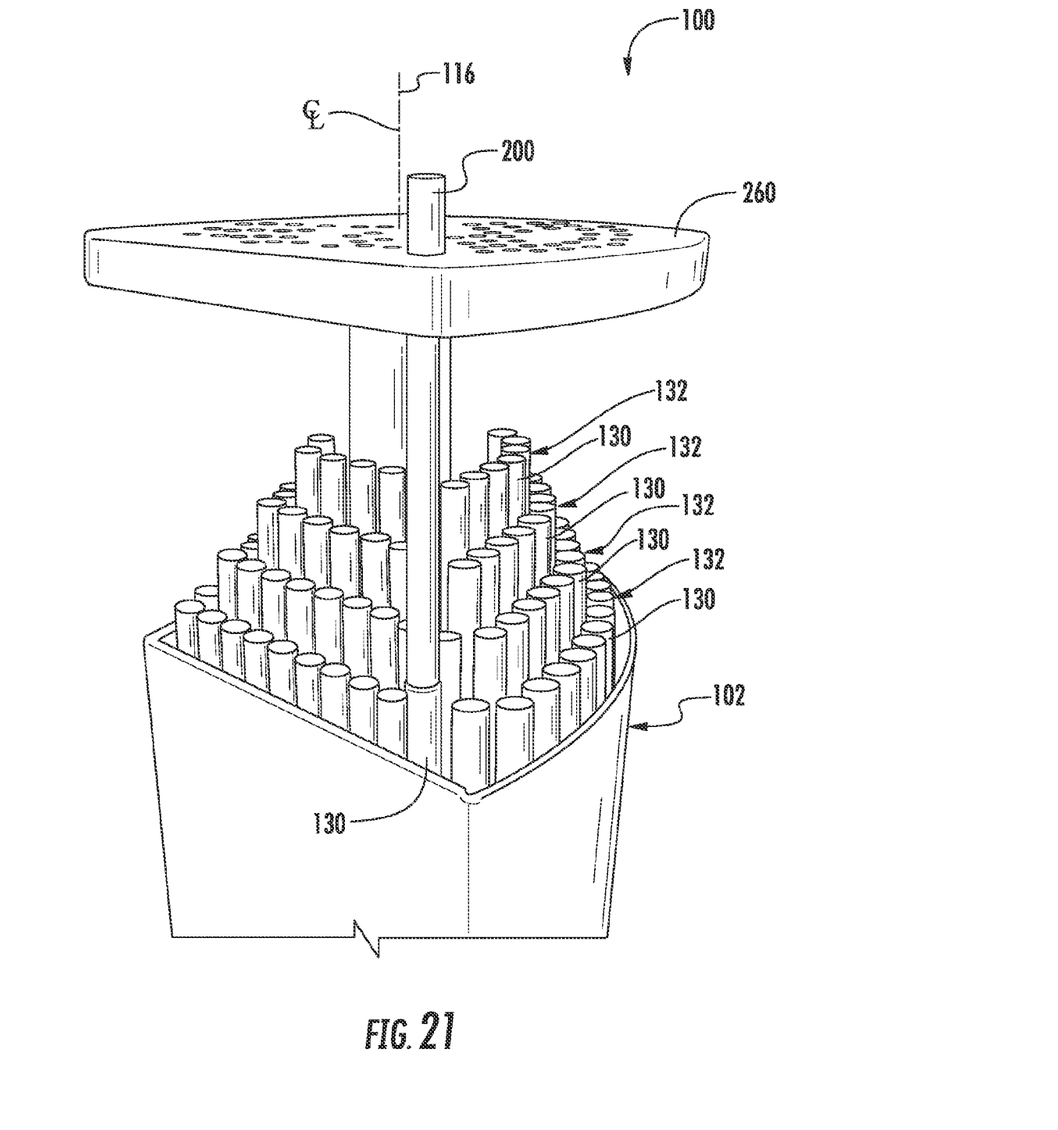
FIG. 21 is a side view of the bundled tube fuel injector as shown in FIG. 3 with pre-mix tubes exposed, according to one embodiment of the present invention.

In one embodiment, as illustrated in FIG. 21, the pre-mix tubes 130 of an outer radial row 132 are cut to a shorter axial length than an adjacent inner radial row as measured from the fuel distribution module 102 with respect to the axial centerline 116. The pre-mix tube 130 may be cut using any known method for cutting tubing, including but not limited to scoring, electrical discharge machining (EDM), torch cutting or by using a cutting blade.

At step 304, the method 300 includes aligning the tube tip 200 with the pre-mix tube 130. In one embodiment, the tube tip 200 is aligned with the premix tube 130 by seating the end portion 136 of the pre-mix tube 130 into the socket 218 defined at the mating end portion 212 of the tube tip 200. In one embodiment, the tube tip 200 is aligned with the premix tube 130 by seating the end portion 136 of the pre-mix tube 130 into the step 234 defined at the radially extending mating surface 232 of the tube tip 200. In one embodiment, the tube tip 200 is aligned with the premix tube 130 by fixing the coupling sleeve 256 to one of the tube tip 200 or the pre-mix tube 130.

In one embodiment, as shown in FIG. 21, tube tip 200 may be aligned by inserting the tube tip 200 through an alignment fixture 260. The alignment fixture 260 may be coupled to the bundled tube fuel injector 100 to facilitate alignment and/or attachment of the tube tip 200 to the pre-mix tube 130. In one embodiment, the alignment fixture comprises the aft plate 112. In one embodiment, step 304 includes coaxially aligning the tube tip 200 with the pre-mix tube 130.

At step 306, the method 300 includes fixedly connecting the tube tip 200 to the pre-mix tube 130. In one embodiment, step 306 includes placing the coupling sleeve 256 circumferentially around the joint 254. In one embodiment, step 306 includes fixedly connecting the tube tip 200 to the pre-mix tube 130 via at least one of furnace brazing, induction brazing, orbital welding, laser welding, friction welding, electron beam welding, diffusion bonding, plasma spraying, thermally resistant adhesive, adhesive cladding and high velocity oxy-fuel coating spraying. In one embodiment, the method 300 may further include performing a leak check at a connection joint formed between the end portion 136 of the pre-mix tube 130 and the mating end portion 212 of the tube tip 200.

Figure 22:
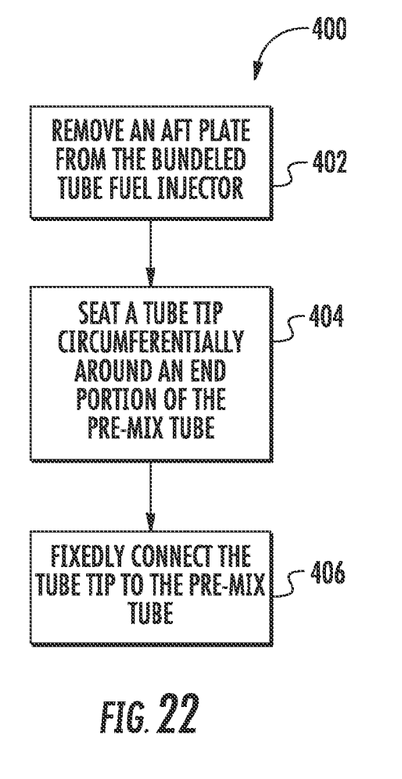
FIG. 22 is a block diagram of an exemplary method for repairing the pre-mix tubes of the bundled tube fuel injector, according to one embodiment of the present disclosure.

FIG. 22 is a block diagram illustrating an exemplary method 400 for repairing the bundled tube fuel injector 100. At step 402, the method 400 includes removing the aft plate 112 from the bundled tube fuel injector 100. Step 402 may include cutting away at least a portion of the aft plate 112 that surrounds the pre-mix tubes 130. The aft plate 112 may be cut away using any known method for cutting including but not limited to electrical discharge machining (EDM), torch cutting or by using a cutting blade.

At step 404, the method includes seating the tube tip 200 circumferentially around the end portion 136 of the pre-mix tube 130. In this manner, the tube tip 200 defines a heat shield that extends radially inwardly across the radially extending surface of the pre-mix tube 138.

At step 406, the method 400 includes fixedly connecting the tube tip 200 to the end portion 136 of the pre-mix tube 130. The tube tip 200 may be fixedly connected via at least one of furnace brazing, induction brazing, orbital welding, laser welding, friction welding, electron beam welding, diffusion bonding, plasma spraying, thermally resistant adhesive, adhesive cladding and high velocity oxy-fuel coating spraying.

In one embodiment, the method 400 further includes coaxially aligning the tube tip 200 with the pre-mix tube 130. In one embodiment, the method 400 includes aligning the tube tip 200 with a corresponding pre-mix tube passage 118 and reinstalling the aft plate 112.

Figure 23:
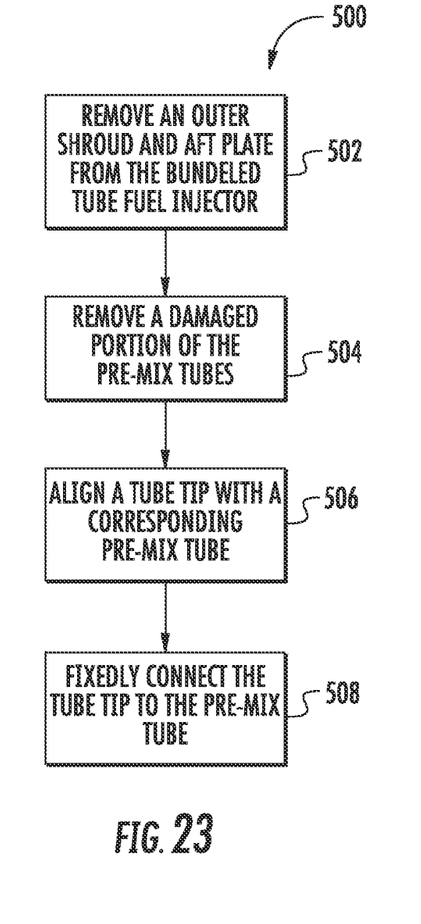
FIG. 23 is a block diagram of an exemplary method for repairing the pre-mix tubes of the bundled tube fuel injector, according to one embodiment of the present disclosure.

FIG. 23 is a block diagram illustrating an exemplary method 500 for repairing the bundled tube fuel injector 100 wherein the pre-mix tubes 130 are segmented into the radially separated rows 132. At step 502, the method 500 includes removing the outer shroud 126 and/or the aft plate 112 from the bundled tube fuel injector 100 to expose a portion of the pre-mix tubes 130. The aft plate 112 may be cut away using any known method for cutting including but not limited to electrical discharge machining (EDM), torch cutting or by using a cutting blade.

At step 504, the method 500 includes removing a portion of the pre-mix tubes 130 such that the pre-mix tubes 130 of an outer radial row 132 are cut to a shorter axial length than an adjacent inner radial row 132 as measured from the fuel distribution module 102 with respect to the axial centerline 116. The portion of the pre-mix tube 130 may be removed using any known method for cutting tubing including but not limited to scoring, electrical discharge machining (EDM), torch cutting or by using a cutting blade.

At step 506, the method 500 includes aligning the tube tip 200 with a corresponding pre-mix tube 130. In one embodiment, the tube tip 200 is aligned with the premix tube 130 by seating the end portion 136 of the pre-mix tube 130 into the socket 218 defined at the mating end portion 212 of the tube tip 200. In one embodiment, the tube tip 200 is aligned with the premix tube 130 by seating the end portion 136 of the pre-mix tube 130 into the step 234 defined at the radially extending mating surface 232 of the tube tip 200. In one embodiment, the tube tip 200 is aligned with the premix tube 130 by fixing the coupling sleeve 256 to one of the tube tip 200 or the pre-mix tube 130. In one embodiment, as shown in FIG. 22, the tube tip 200 may be aligned by inserting the tube tip 200 through an alignment fixture 260. The alignment fixture 260 may be coupled to the bundled tube fuel injector 100 to facilitate alignment and/or attachment of the tube tip 200 to the pre-mix tube 130. In one embodiment, step 304 includes coaxially aligning the tube tip 200 with the pre-mix tube 130.

At step 508, the method 500 includes fixedly connecting the tube tip 200 to the pre-mix tube 130. In one embodiment, step 508 includes placing the coupling sleeve 256 circumferentially around the joint 254. In one embodiment, step 508 includes fixedly connecting the tube tip 200 to the pre-mix tube 130 via at least one of furnace brazing, induction brazing, orbital welding, laser welding, friction welding, electron beam welding, diffusion bonding, plasma spraying, thermally resistant adhesive, adhesive cladding and high velocity oxy-fuel coating spraying.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for repairing a bundled tube fuel injector having a plurality of parallel pre-mix tubes arranged annularly about an axial centerline of the bundled tube fuel injector and segmented into radially separated rows, comprising:

cutting away at least a portion of an aft plate and an outer shroud that surrounds the pre-mix tubes;

removing a damaged portion of the pre-mix tubes, wherein the pre-mix tubes of an outer radial row are cut to a shorter axial length than an adjacent inner radial row;

aligning a tube tip with a corresponding one of the pre-mix tubes; and fixedly connecting the tube tip to the corresponding pre-mix tube.

2. The method as in claim 1, wherein a mating end portion of the tube tip defines a socket configured to receive an end portion of the pre-mix tube, the step of aligning the tube tip with the pre-mix tube comprising seating the end portion of the pre-mix tube into the socket.

3. The method as in claim 1, wherein the step of aligning the tube tip with the pre-mix tube comprises inserting the tube tip through an alignment fixture.

4. The method as in claim 1, wherein the step of aligning the tube tip with the pre-mix tube comprises fixing a coupling sleeve to one of the tube tip or the pre-mix tube.

5. The method as in claim 1, wherein the step of fixedly connecting the tube tip to the pre-mix tube comprises at least one of furnace brazing, induction brazing, orbital welding, laser welding, friction welding, electron beam welding, diffusion bonding, plasma spraying, adhesive cladding, applying a thermally resistant adhesive and high velocity oxy-fuel coating spraying.

6. The method as in claim 1, wherein a connection joint is defined between a downstream end portion of the pre-mix tube and a mating end of the tube tip, the step of fixedly connecting the downstream end portion of the pre-mix tube to the mating end of the tube tip comprising positioning a coupling sleeve circumferentially around the joint.

7. The method as in claim 1, further comprising performing a leak check at a connection joint formed between an end portion of the pre-mix tube and a mating end of the tube tip.

8. A method for repairing a bundled tube fuel injector having a plurality of parallel pre-mix tubes arranged annularly about an axial centerline of the bundled tube fuel injector and segmented into radially separated rows, the method comprising:

removing an outer shroud and aft plate from the bundled tube fuel injector to expose a portion of the pre-mix tubes;

removing a damaged portion of the pre-mix tubes, wherein the pre-mix tubes of an outer radial row are cut to a shorter axial length than an adjacent inner radial row;

aligning a tube tip with a corresponding one of the pre-mix tube; and fixedly connecting the tube tip to the pre-mix tube.

9. The method as in claim 8, wherein a portion of the pre-mix tube extends through the aft plate of the bundled tube fuel injector, the step of removing the damaged portion of the pre-mix tube comprising cutting away at least a portion of the aft plate.

10. The method as in claim 8, wherein a mating end of the tube tip defines a socket configured to receive an end portion of the pre-mix tube, the step of aligning the tube tip with the pre-mix tube comprising seating the end portion of the pre-mix tube into the socket.

11. The method as in claim 8, wherein the step of aligning the tube tip with the pre-mix tube comprises inserting the tube tip through an alignment fixture.

12. The method as in claim 8, wherein the step of aligning the tube tip with the pre-mix tube comprises fixing a coupling sleeve to one of the tube tip or the pre-mix tube.

13. The method as in claim 8, wherein the step of fixedly connecting the tube tip to the pre-mix tube comprises at least one of furnace brazing, induction brazing, orbital welding, laser welding, friction welding, electron beam welding, diffusion bonding, plasma spraying and high velocity oxy-fuel coating spraying.

14. The method as in claim 8, wherein a connection joint is defined between an end portion of the pre-mix tube and a mating end of the tube tip, the step of fixedly connecting the end portion of the pre-mix tube to the mating end of the tube tip comprising positioning a coupling sleeve circumferentially around the joint.

\* \* \* \* \*